US012302262B2

(12) United States Patent
Ryu et al.

(10) Patent No.: US 12,302,262 B2
(45) Date of Patent: May 13, 2025

(54) USING AUTOMATIC GAIN CONTROL SYMBOL TO INDICATE SIDELINK MINI-SLOT

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Piyush Gupta, Bridgewater, NJ (US); Junyi Li, Fairless Hills, PA (US); Peter Gaal, San Diego, CA (US); Hua Wang, Basking Ridge, NJ (US); Juan Montojo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/498,249

(22) Filed: Oct. 31, 2023

(65) Prior Publication Data

US 2024/0064664 A1 Feb. 22, 2024

Related U.S. Application Data

(63) Continuation of application No. 17/647,718, filed on Jan. 11, 2022.

(51) Int. Cl.
*H04W 52/52* (2009.01)
*H04W 72/1263* (2023.01)

(52) U.S. Cl.
CPC ....... *H04W 52/52* (2013.01); *H04W 72/1263* (2013.01)

(58) Field of Classification Search
CPC .......................... H04W 52/52; H04W 72/1263
See application file for complete search history.

(56) References Cited

U.S. PATENT DOCUMENTS 9,270,312 B2  2/2016  Park et al.
10,917,274 B2  2/2021  Werner et al.
(Continued)

FOREIGN PATENT DOCUMENTS

CN   111181710 A   5/2020
CN   113632582 A   11/2021
(Continued)

OTHER PUBLICATIONS

3GPP TR 37.985 V17.0.0 (Dec. 2021) 3rd Generation Partnership Project: "Technical Specification Group Radio Access Network: Overall description of Radio Access Network (RAN) aspects for Vehicle-to-everything (V2X) based on LTE and NR (Release 17)", 3rd Generation Partnership Project, Mobile Competence Centre, 650, Route Des Lucioles, F-06921 Sophia-Antipolis Cedex, France, No. V17.0.0, Jan. 5, 2022, pp. 1-37, XP052118397.
(Continued)

Primary Examiner — David Bilodeau
(74) Attorney, Agent, or Firm — Dinsmore & Shohl LLP

(57) ABSTRACT

Aspects of the present disclosure provide techniques for using automatic gain control symbols to indicate a sidelink mini-slot. A method performed by a transmitting user equipment includes transmitting, during a first time portion of a symbol within a slot, a first beam associated with a first receiving user equipment. The first time portion of the symbol is configured to indicate that the first receiving user equipment will receive another transmission from the transmitting user equipment during a first mini-slot within the slot associated with the first time portion. The method may further include transmitting, during a second time portion of the symbol within the slot, a second beam associated with a (Continued)

second receiving user equipment. The second time portion of the symbol is configured to indicate that the second receiving user equipment will receive another transmission from the transmitting user equipment during a second mini-slot within the slot.

20 Claims, 13 Drawing Sheets

(56) References Cited

U.S. PATENT DOCUMENTS

| | | | |
|---|---|---|---|
| 11,616,562 B1 | 3/2023 | Pratas et al. | |
| 2009/0268678 A1 | 10/2009 | Huo et al. | |
| 2020/0145079 A1 | 5/2020 | Marinier et al. | |
| 2020/0313706 A1 | 10/2020 | Gulati et al. | |
| 2021/0022139 A1 | 1/2021 | Shin et al. | |
| 2021/0219268 A1* | 7/2021 | Li | H04B 17/318 |
| 2021/0314933 A1* | 10/2021 | Zhang | H04W 72/20 |
| 2021/0360590 A1 | 11/2021 | Lee et al. | |
| 2022/0104126 A1* | 3/2022 | Lee | H04W 52/0219 |
| 2022/0201629 A1* | 6/2022 | Ko | H04W 56/00 |
| 2023/0224829 A1* | 7/2023 | Ryu | H04W 72/1263 |
| | | | 455/522 |
| 2023/0224830 A1 | 7/2023 | Ryu et al. | |
| 2023/0224831 A1* | 7/2023 | Ryu | H04W 52/281 |
| | | | 370/318 |
| 2023/0262618 A1* | 8/2023 | Ryu | H04L 27/2607 |
| | | | 370/318 |
| 2024/0073947 A1* | 2/2024 | Babaei | H04W 74/0808 |
| 2024/0137975 A1* | 4/2024 | Ryu | H04W 74/0808 |

FOREIGN PATENT DOCUMENTS

| | | |
|---|---|---|
| EP | 3413638 A1 | 12/2018 |
| EP | 3910969 A1 | 11/2021 |
| WO | 2020142999 A1 | 7/2020 |
| WO | 2021034572 A1 | 2/2021 |

OTHER PUBLICATIONS

Garcia M.H.C., et al., "A Tutorial on 5G NR V2X Communications", in IEEE Communications Surveys and Tutorials, vol. 23, No. 3, Third Quarter, Arxiv.Org, Cornell University Library, 201 Olin Library Cornell University, Ithaca, NY 14853, Feb. 8, 2021, XP081877162, 55 Pages, p. 18-p. 21, figures 8, 10, 14, sections V.A.1), V.B, V.B.5), V.C.6), VI.B, VII.C, VIII.B, pp. 1972-2026.
Harounabadi M., et al., "V2X in 3GPP Standardization: NR Sidelink in Rel-16 and Beyond", arxiv.org, Cornell University Library, 201 Olin Library Cornell University Ithaca, NY, 14853, Apr. 22, 2021, pp. 1-10.
Huawei., et al., "UL Power Control for Short TTI", 3GPP TSG RAN WG1 Meeting #88, R1-1701738, 3rd Generation Partnership Project, Mobile Competence Centre, 650, Route Des Lucioles, F-06921 Sophia-Antipolis Cedex, France, vol. Ran WG1, No. Athens, Greece, Feb. 13, 2017-Feb. 17, 2017, Feb. 6, 2017, 4 Pages.
Intel Corporation: "Considerations on Support of Short TTI for LTE V2V Sidelink Communication", 3GPP TSG RAN WG1 Meeting #89, R1-1707307, 3rd Generation Partnership Project, Mobile Competence Centre, 650, Route Des Lucioles, F-06921 Sophia-Antipolis Cedex, France, vol. RAN WG1, No. Hangzhou, May 15, 2017-May 19, 2017, May 14, 2017, pp. 1-8, XP051272520.
Intel Corporation: "Synchronization Framework for NR V2X Sidelink Communication", 3GPP TSG RAN WG1 Meeting #95, R1-1812490, 3rd Generation Partnership Project, Mobile Competence Centre, 650, Route Des Lucioles, F-06921 Sophia-Antipolis Cedex, France, vol. Ran WG1, No. Spokane, USA, Nov. 12, 2018-Nov. 16, 2018, Nov. 11, 2018, pp. 1-13, XP051554434.
International Search Report and Written Opinion—PCT/US2023/060275—ISA/EPO—May 8, 2023.
International Search Report and Written Opinion—PCT/US2023/060277—ISA/EPO—May 3, 2023.
Samsung: "Summary#2 of discussion on PSSCH DMRS patterns and for the number of PSSCH symbols", 3GPP TSG RAN1#99 R1-1913576, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019, 19 Pages, XP051830853.

* cited by examiner

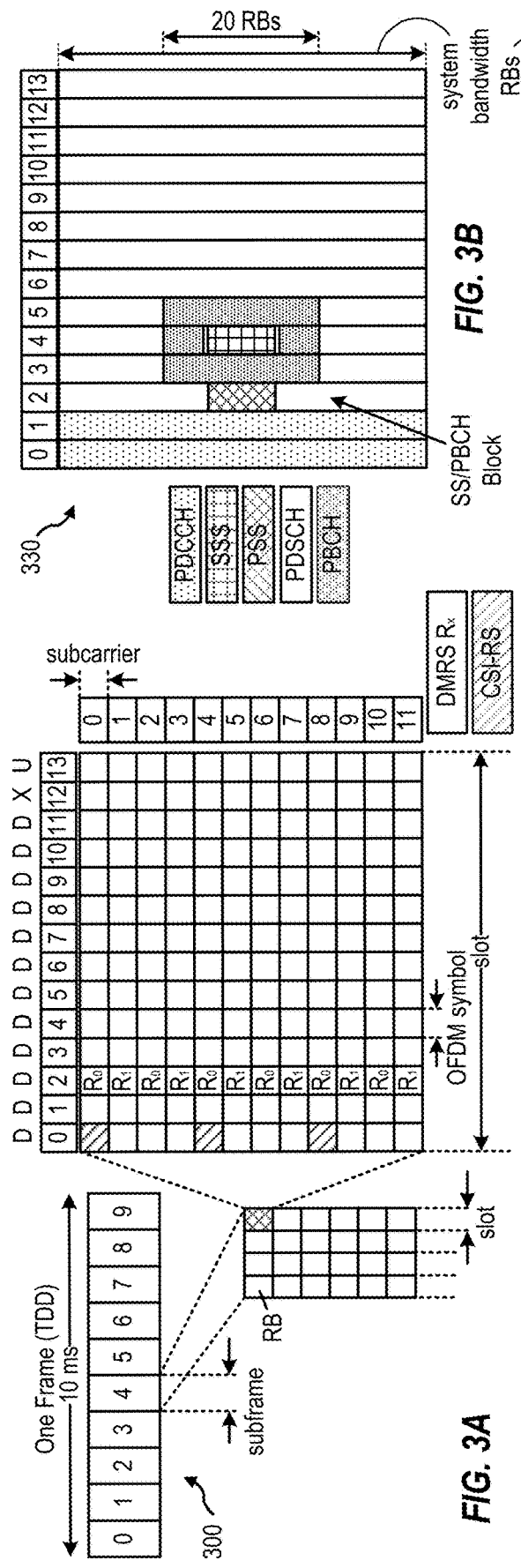
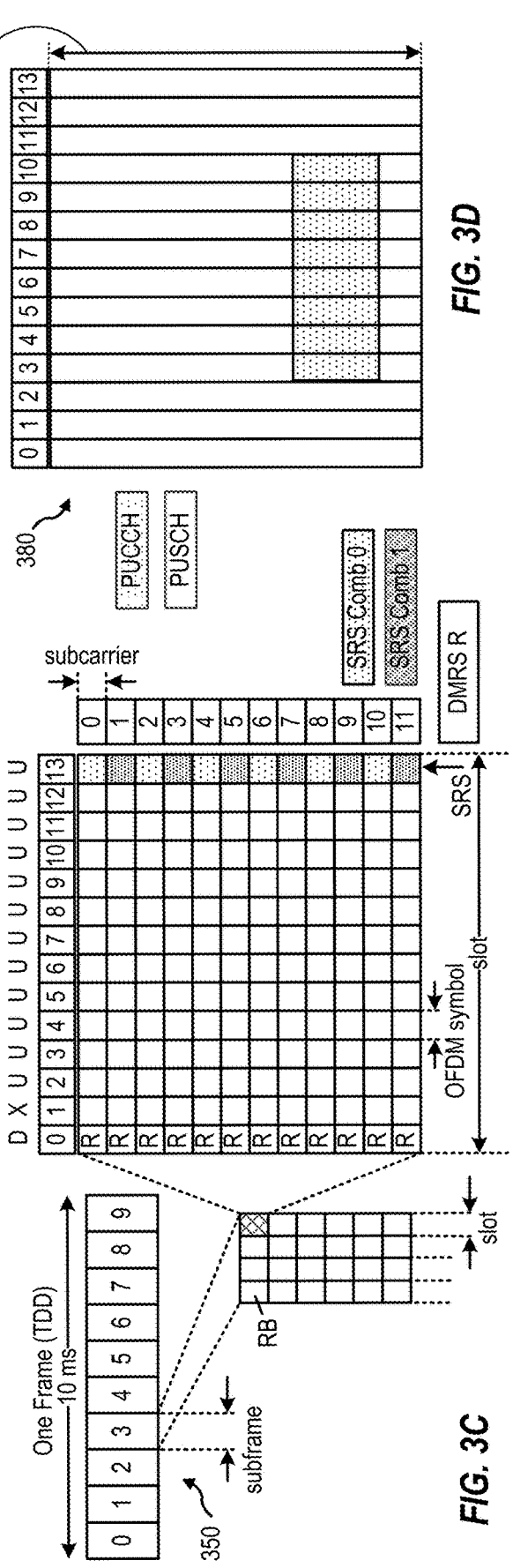
FIG. 3A
FIG. 3B
FIG. 3C
FIG. 3D

USING AUTOMATIC GAIN CONTROL SYMBOL TO INDICATE SIDELINK MINI-SLOT

CROSS-REFERENCE TO RELATED APPLICATION

This application is a continuation and claims priority to of U.S. patent application Ser. No. 17/647,718, filed Jan. 11, 2022, which is incorporated herein by reference in its entirety.

INTRODUCTION

Aspects of the present disclosure relate to wireless communications, and more particularly, to techniques for using an automatic gain control symbol to indicate a sidelink mini-slot.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a transmitting user equipment, including transmitting, during a first time portion of a symbol within a slot, a first beam associated with a first receiving user equipment, wherein the first time portion of the symbol is configured to indicate that the first receiving user equipment will receive another transmission from the transmitting user equipment during a first mini-slot within the slot associated with the first time portion.

Another aspect provides a method for wireless communication by a transmitting user equipment, including transmitting a first automatic gain control symbol in a slot at a selected power level using one or more selected resource blocks, wherein each selected resource block of the one or more selected resource blocks indicates a mini-slot within the slot in which the transmitting user equipment is scheduled to transmit, and wherein the selected power level is based on a highest transmit power of any mini-slot in which the transmitting user equipment is scheduled to transmit in the slot.

Another aspect provides a method for wireless communication by a receiving user equipment, including receiving an automatic gain control symbol from a first transmitting user equipment in a slot, wherein the automatic gain control symbol indicates the first transmitting user equipment is scheduled to transmit at least one mini-slot within the slot and determining an automatic gain control setting based on the received automatic gain control symbol.

Another aspect provides a method for wireless communication by a transmitting user equipment, including transmitting an automatic gain control symbol in a slot at a selected power level, wherein the selected power level is based on a highest transmit power of any symbol scheduled to be transmitted in a slot comprising the automatic gain control symbol, and wherein one or more of transmit powers are configured for a plurality of symbols within the slot comprising the automatic gain control symbol.

Another aspect provides a method for wireless communication by a receiving user equipment, including determining a received power level for an automatic gain control symbol; determining a positive power offset to apply to the received power level; and determining an automatic gain control setting based on the received power level and the determined positive power offset.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A, 3B, 3C, and 3D depict various example aspects of data structures for a wireless communication network.

DETAILED DESCRIPTION

Figure 1:
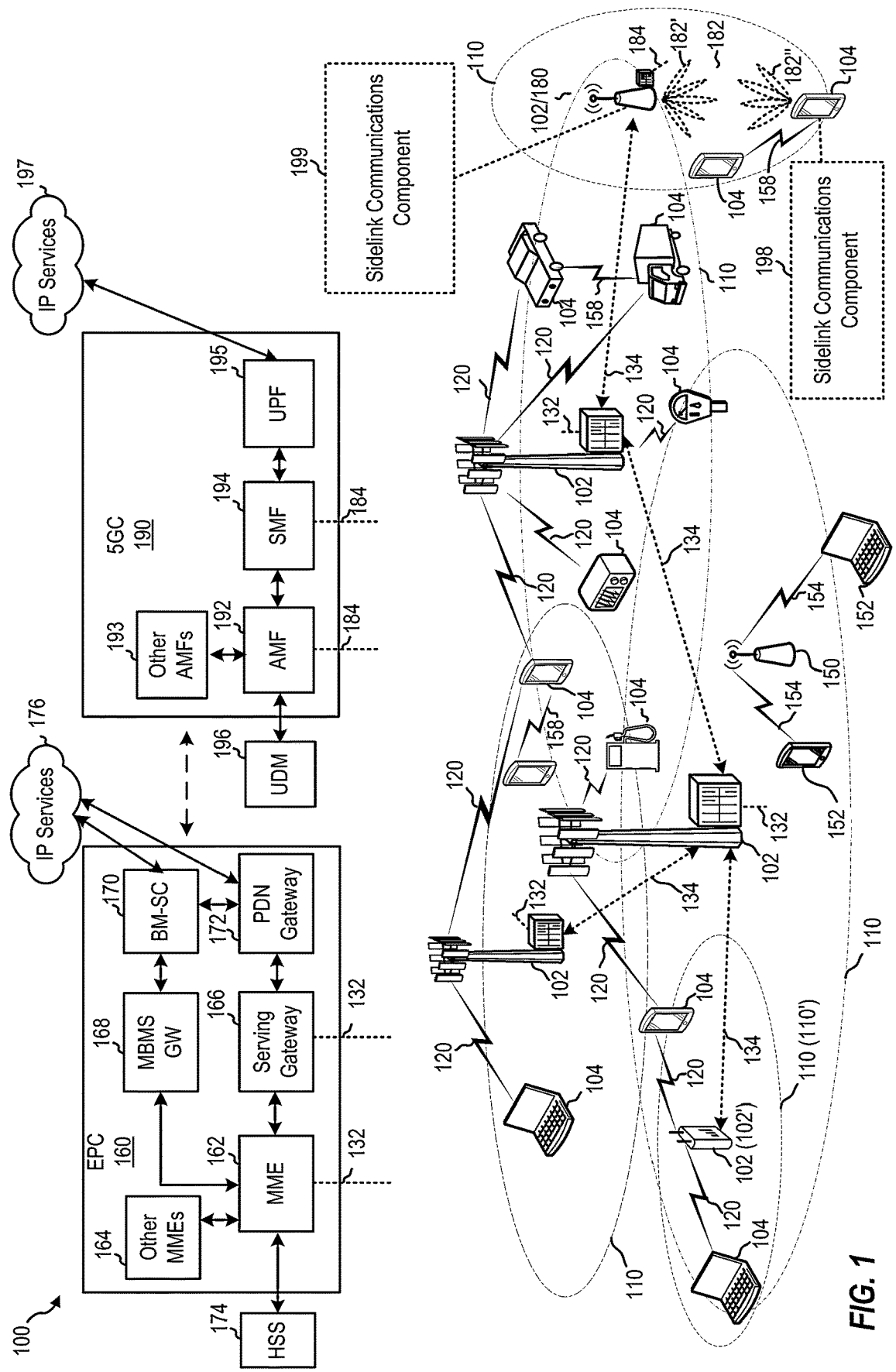
FIG. 1 is a block diagram conceptually illustrating an example wireless communication network.

Aspects of the present disclosure provide apparatuses, methods, processing systems, and computer-readable mediums for using an automatic gain control symbol to indicate a sidelink mini-slot.

In wireless communication systems, a first user equipment (UE) may communicate with a second UE over an air interface using a device-to-device (D2D) technique known as sidelink communication. In a sidelink communication, the first UE may transmit data and/or control information directly to a second UE during a designated time window (e.g., a slot).

During sidelink communications, a transmitting UE may transmit a symbol to be used by a receiving UE for automatic gain control (AGC) (an "AGC symbol"). When received by the receiving UE, the AGC symbol allows the receiving UE to adjust its receiver gain in order to maximize performance of various aspects of the receive chain. For example, adjusting the gain of a signal before passing the signal to an analog-to-digital converter (ADC) ensures that the ADC range is used effectively and improves performance characteristics, such as signal-to-noise ratio (SNR).

Conventionally sidelink communications take place during slots defined by a slot start symbol parameter and a slot symbol length parameter. However, there is a desire to enable UEs to transmit mini-slots within a conventional slot structure. Mini-slots beneficially allow a UE to make multiple small transmissions, for example to multiple other receiving UEs, during a single slot.

However, a complication arises as to how to configure AGC symbols when using mini-slots such that nearby UEs, which may receive the mini-slot transmissions as interference, may appropriately adjust their gains during such transmissions. For example, if a first mini-slot within a slot is to be transmitted with a first beam and a second mini-slot within the slot is to be transmitted on a second beam, then there is a problem of what beam to use (e.g., the first, the second beam, or an alternative beam) when transmitting the AGC so that unintended recipients of the mini-slot transmissions can properly configure their AGC.

Aspects described herein provide a technical solution to the aforementioned technical problem. In one aspect, an AGC symbol may be split in the time domain, with each time segment corresponding to a mini-slot within a current slot structure. For example, assuming the AGC symbol is split into two time segments, then the first segment can be used to transmit an AGC symbol portion on a first beam and the second time segment can be used to transmit another AGC symbol portion on a second beam. This is possible because the beam switch time may be only a fraction of a duration of an orthogonal frequency division multiplexing (OFDM) symbol. An unintended recipient UE (i.e., a UE other than the UE for which either of the two beams is intended) may then measure the received power during each AGC symbol portion and set its gain based, for example, on the maximum received power of the two portions. Likewise, the intended recipient UEs can do the same.

In another aspect, the resource block(s) used for transmitting an AGC symbol may be associated with different mini-slots such that receiving UEs (including unintended recipients) can determine which mini-slot(s) will be used during a slot and can make AGC adjustments based on the known location of the mini-slot within a slot and the received signal power of the AGC symbol. For example, an unintended recipient UE may receive an AGC symbol and determine, based on the resource block in which the AGC symbol was received, that the transmitting UE plans to transmit during a particular mini-slot location (associated with the resource block) within the slot and may adjust its AGC level during the particular mini-slot. In this way, UEs capable of receiving the mini-slot transmissions may maintain proper AGC levels when receiving interference from nearby transmitting UEs.

In either of the aforementioned aspects, AGC operation at receiving UEs is improved, and thus communication reliability is also improved. Because communications are more reliable, the use of the spectrum is more efficient and transmitters have to retransmit less often (and receivers have to try and receive less often), thus leading to improved device performance, such as reduced latency in communications and reduced power consumption by transmitting and receiving user equipments.

Introduction to Wireless Communication Networks

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communication links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes sidelink communications component 199, which may be configured for transmission of mini-slots according to aspects of the disclosure. Wireless communication network 100 further includes sidelink communications component 198, which may be which may be configured for transmission of mini-slots according to aspects of the disclosure.

Figure 2:
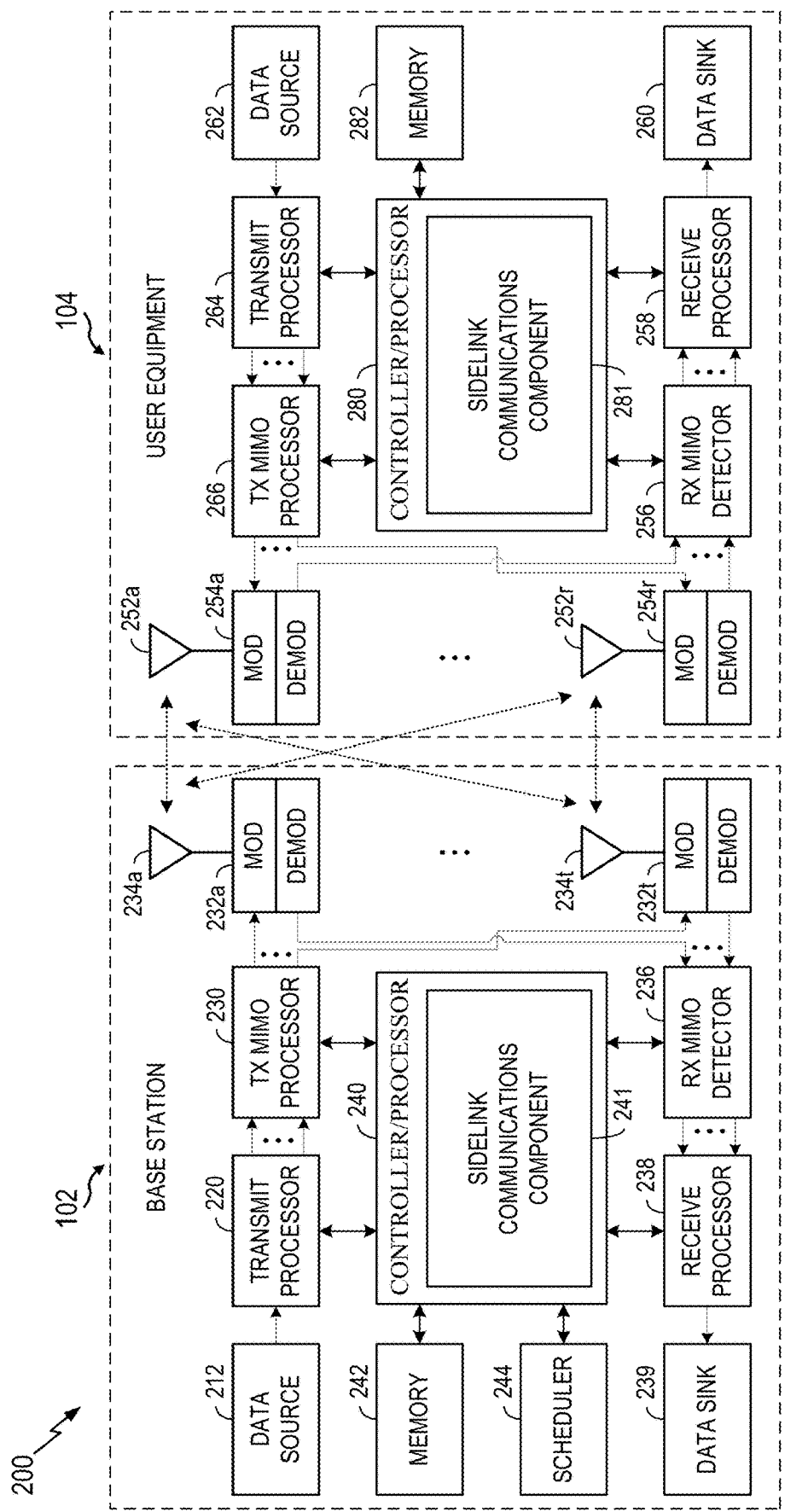
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes sidelink communications component 241, which may be representative of sidelink communications component 199 of FIG. 1. Notably, while depicted as an aspect of controller/processor 240, sidelink communications component 241 may be implemented additionally or alternatively in various other aspects of BS 102 in other implementations.

Generally, UE 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes sidelink communications component 281, which may be representative of sidelink communications component 198 of FIG. 1. Notably, while depicted as an aspect of controller/processor 280, sidelink communications component 281 may be implemented additionally or alternatively in various other aspects of UE 104 in other implementations.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Aspects Related to Using AGC Symbols to Indicate Mini-Slots in Sidelink Communications Aspects described herein introduce methods for using an AGC symbol to indicate sidelink mini-slots.

Figure 4:
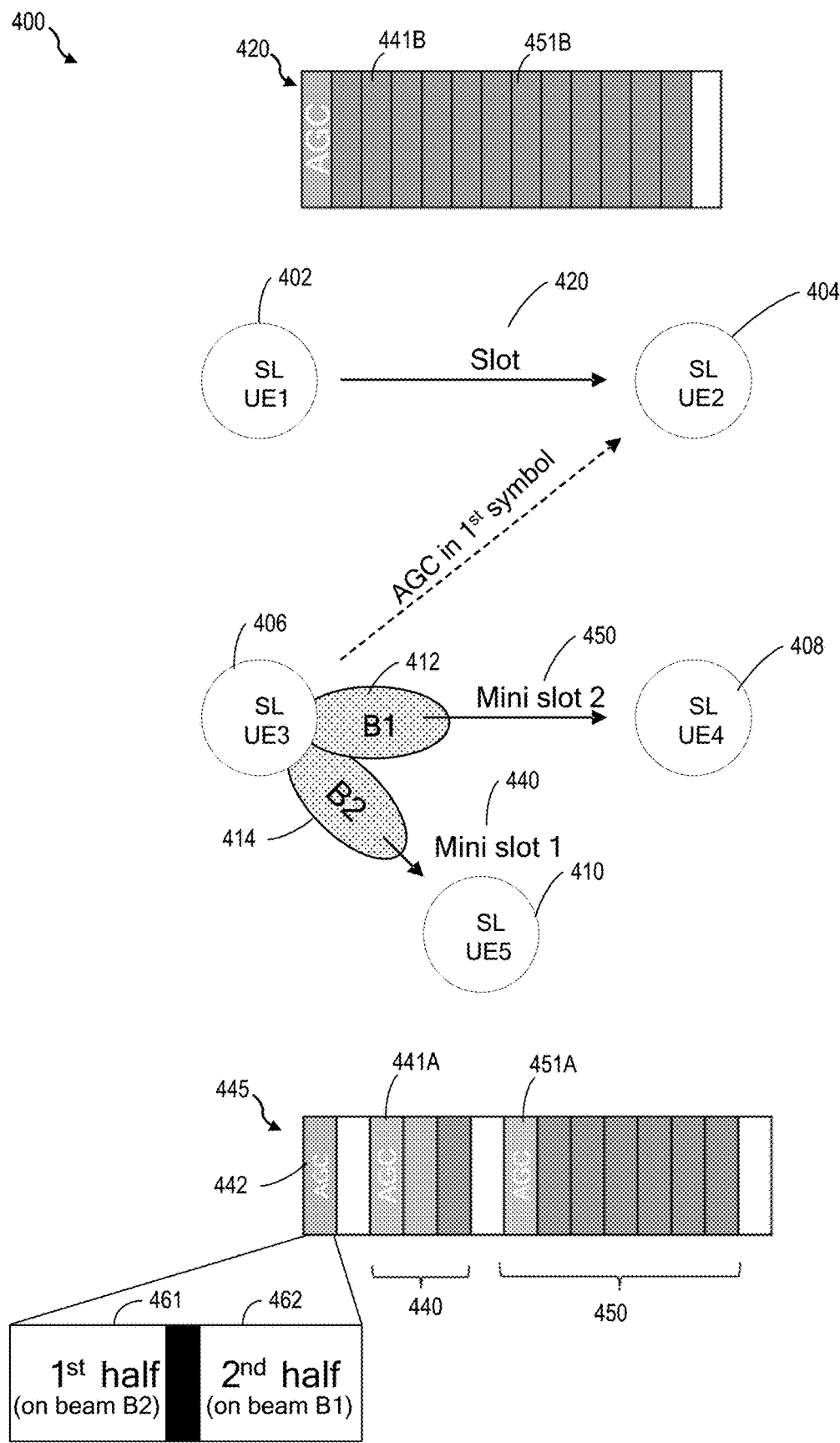
FIG. 4 depicts an example of dividing a first automatic gain control symbol in the time domain or to indicate one or more mini-slots that are going to be used for si delink transmission.

FIG. 4 depicts an example 400 of dividing a first automatic gain control symbol in the time domain or to indicate one or more mini-slots that are going to be used for sidelink transmission.

In the depicted example, a first user equipment 402 is transmitting a slot 420 to second user equipment 404. Concurrently, a third user equipment 406 is transmitting a first mini-slot 440 to a fifth user equipment 410, and a second mini-slot 450 to a fourth user equipment 408. Here, the third user equipment 406 is configured to beamform the first mini-slot 440 and the second mini-slot 450 using different beams.

In this example, the third user equipment 406 indicates to surrounding user equipments its intention to transmit the first and second mini-slots and enables those surrounding user equipments to set their AGC appropriately (e.g., during the reception of slot 420 at the second user equipment 404) by splitting AGC symbol 442 in the time domain and transmitting a first portion of AGC symbol 442 during a first time segment 461 on the first beam 412 and a second portion of AGC symbol 442 during a second time segment 462 on the second beam 414. A receiving user equipment, such as second user equipment 404, may then receive both portions of AGC symbol 442 and determine both what mini-slots third user equipment 406 plans to transmit (here first mini-slot 440 and second mini-slot 450) and what gain setting to use during each of those transmissions. In some aspects, second user equipment 404 may set its AGC based on the highest signal power received of the two portions of AGC symbol 442 and use that power level to set AGC for the duration of slot 420. In other aspects, second user equipment 404 may adjust its AGC setting multiple times during slot 420 corresponding with the transmissions of mini-slots 440 and 450. For example, second user equipment 404 may adjust its AGC setting during slot 520 at a third symbol 541B corresponding to AGC symbol 541A of first mini-slot 540 in slot 545. Second user equipment 404 may also adjust its AGC setting at a seventh symbol 551B corresponding to AGC symbol 551A of second mini-slot 550 in slot 545.

In this example, AGC symbols 441 and 451 correspond to the mini-slots 440 and 450, respectively, are not divided, and are transmitted along with their corresponding mini-slot and corresponding beams.

Note that if a user equipment is not able to switch from transmitting to receiving, or receiving to transmitting within a slot (e.g., if the user equipment was not be able to transmit in the first mini-slot 440 and then receive in the second mini-slot 450), then separate mini-slot AGC symbols (here 441 and 451) are not needed.

Figure 5:
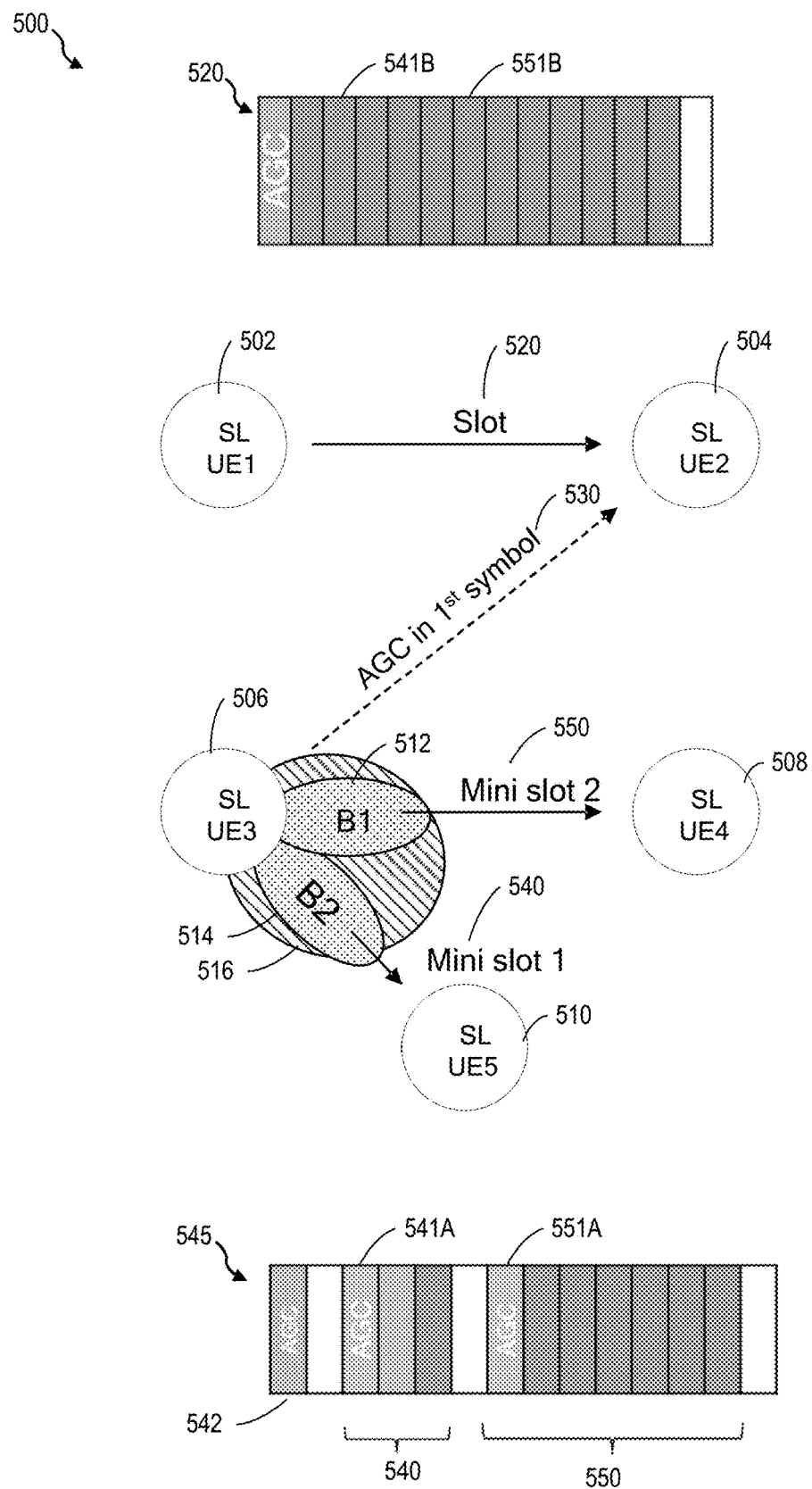
FIG. 5 depicts an example of using AGC symbol resource blocks to indicate mini-slot transmissions.

FIG. 5 depicts an example 500 of using AGC symbol resource blocks to indicate mini-slot transmissions. In particular, the sidelink communications in example 500 are similar to that of FIG. 4; however, in example 500 the third user equipment 506 transmits a broad beam 516 (compared to narrower beams 512 (B1) and 514 (B2) on selected resource blocks to indicate in which mini-slots it will transmit and using what power level. In this example, fourth user equipment 508 and fifth user equipment 510 are the intended recipients of mini-slots 540 and 550, and second user equipment 504 also receives these transmissions as interference 530. Subsequently, the second mini-slot 550 is transmitted on the first beam 512 and the first mini-slot 540 is transmitted on the second beam 514.

In this example, the third user equipment 506 determines the maximum transmit power between the first mini-slot 540 transmit power and the second mini-slot 550 transmit power and uses this power to transmit the first AGC symbol 542 on broad beam 516.

Figure 7:
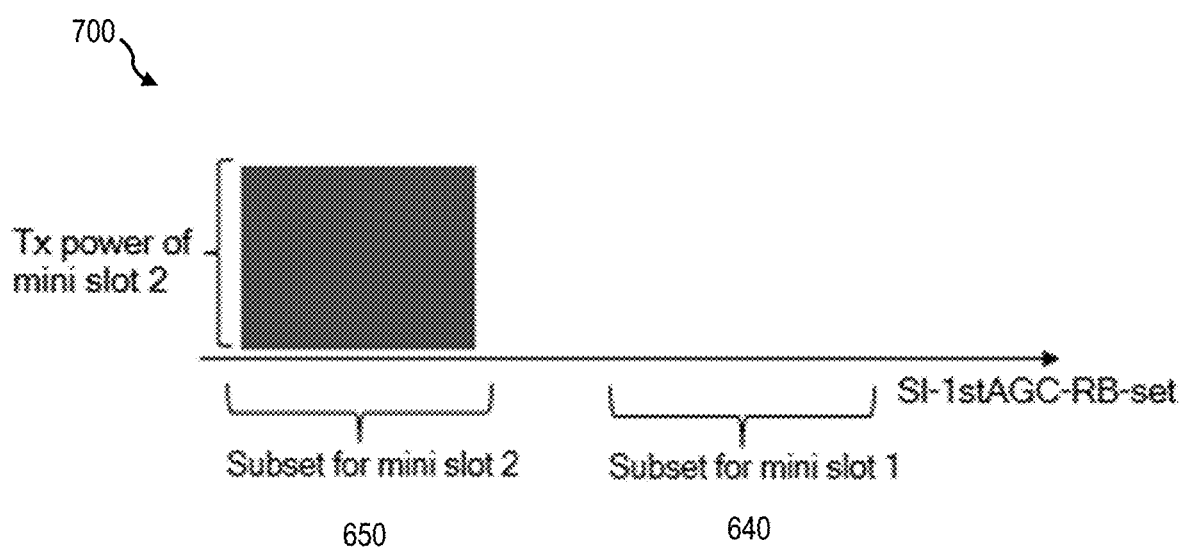
FIG. 7 depicts an example of a transmit power for a resource block set associated with a mini-slot.

In contrast to the example in FIG. 4, here the first AGC symbol 542 is being transmitted on a single beam. Thus, in order to allow receiving user equipments to determine in which mini-slots the third user equipment 506 is transmitting, the third user equipment 506 transmits in specific resource blocks corresponding to mini-slots 540 and 550. For example, the resource blocks may be associated with an index that identifies a particular mini-slot arrangement (e.g., a location) within a slot, such as a mini-slot starting at the third symbol and going to the fifth symbol as with mini-slot 540, or a mini-slot starting at the seventh symbol and going to the thirteenth symbol as with mini-slot 550. Further, third user equipment 506 may divide transmit power between the resource blocks so that receiving user equipments can determine the appropriate AGC setting for the beams associated with different mini-slots (as depicted in the example of FIG. 7). For example, fourth user equipment 508 can determine based on the received power in a particular resource block(s) that it should set its AGC to a certain level for a mini-slot associated with that resource block(s), and likewise for fifth user equipment 510 and second user equipment 504 (despite it being an unintended recipient of both mini-slots 540 and 550). In particular, by observing the power in the resource blocks corresponding to mini-slots 540 and 550, the second user equipment 504 (which is receiving slot 520 concurrently) can determine which mini-slots will be transmitted, and it can readjust AGC in those mini-slots. In other words, second user equipment 504 may observe the transmission of mini-slots 540 and 550 and, while not receiving the mini-slots, may in turn adjust its AGC during the time periods that the mini-slots will be transmitted. For example, second user equipment 504 may adjust its AGC at third symbol 541B corresponding to AGC symbol 541A of first mini-slot 540, and at seventh symbol 551B corresponding to AGC symbol 551A of second mini-slot 550.

Figure 6:
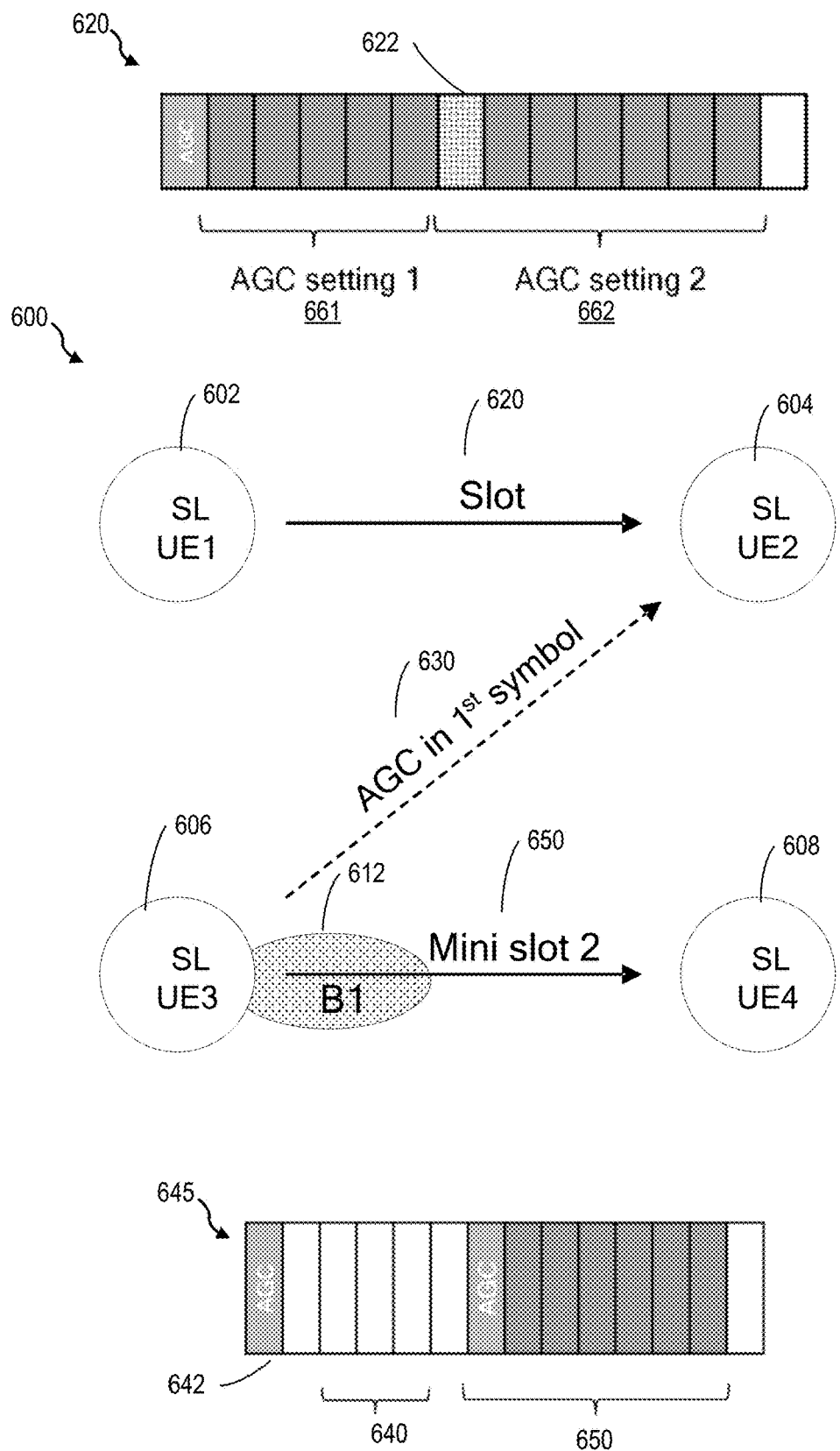
FIG. 6 depicts another example of using AGC symbol resource blocks to indicate mini-slot transmissions.

FIG. 6 depicts another example 600 of using AGC symbol resource blocks to indicate mini-slot transmissions. In particular, a first user equipment 602 is transmitting a slot 620 to second user equipment 604. Concurrently, a third user equipment 606 is transmitting a mini-slot 650 to a fourth user equipment 608. Here, the third user equipment 606 is configured to beamform the mini-slot 650.

Here, the third user equipment 606 indicates to surrounding user equipments its intention to transmit the mini-slot and enables those surrounding user equipments to set their AGC appropriately (e.g., during the reception of slot 620 at the second user equipment 604). The second user equipment 604 is able to adjust its AGC at a location 622 corresponding to the beginning of the transmission of the mini-slot 650, based on determining that the third user equipment 606 will transmit a mini-slot. As depicted, second user equipment 604 changes its AGC setting from a first setting 661 to a second setting 662 at the point when mini-slot 650 is transmitted. Unlike the example in FIG. 5, here the third user equipment 606 does not transmit during the first mini-slot 640.

FIG. 7 depicts an example 700 of a transmit power for a resource block set associated with a mini-slot. In particular, the transmit power for the particular resource block is set to indicate a transmission of the second mini-slot 650 in FIG. 6 and the lack of a transmission of first mini-slot 640 in FIG. 6.

Receive Power Adjustment by Offsets

In some aspects, it may be desirable for a user equipment receiving an AGC symbol to modify received power measurement by an offset to account for different manners of transmitting the AGC.

Returning to FIG. 5 as an example, the purpose of third UE 506 transmitting the first AGC symbol 542 is to inform nearby user equipments, such as second UE 504, that (1) third UE 506 is going to transmit a mini slot and (2) how much power is actually going to received when third UE 506 transmits the mini slot. In this example, assume that second UE 504 has only one chance to set the AGC gain for the duration of slot 520, and that chance is the first AGC symbol 542. The first objective can be done just by transmitting the first AGC symbol 542. However, the second objective is more challenging owing to the third UE 506 transmitting the first AGC symbol 542 on the broad beam 516, which is not the actual beam that will be used to transmit the mini slots (as those are the narrower beams 512 and 514). Because the broad beam 516 is not the actual beam that will be used to transmit either mini-slot, second UE 504 is not able to estimate the actual receive power of narrower beams 512 or 514.

It is important that second UE 504 does not underestimate the total power it will receive when a mini-slot is transmitted by UE3 because it would cause second UE 504 to set the AGC gain too low. For purposes of this example, assume that broad beam 516 has x dB lower gain than narrower beams 512 and 514. The question then is how to make sure that second UE 504 can estimate the actual receive power when the first AGC symbol 542 is transmitted on broad beam 516 with lower gain than either narrower beams 512 or 514 that will actually be transmitted during slot 520.

One solution is for third UE 506 to transmit the first AGC symbol 542 on broad beam 516 at x dB higher power than if third UE 506 was transmitting it on one of the narrower beams 512 or 514 to compensate for the x dB lower gain on broad beam 516. However, third UE 506 may be constrained in Tx power due to, for example, regulations or hardware limitations. So transmitting the first AGC symbol 542 on broad beam 516 with x dB more power may not always be feasible.

Figure 12:
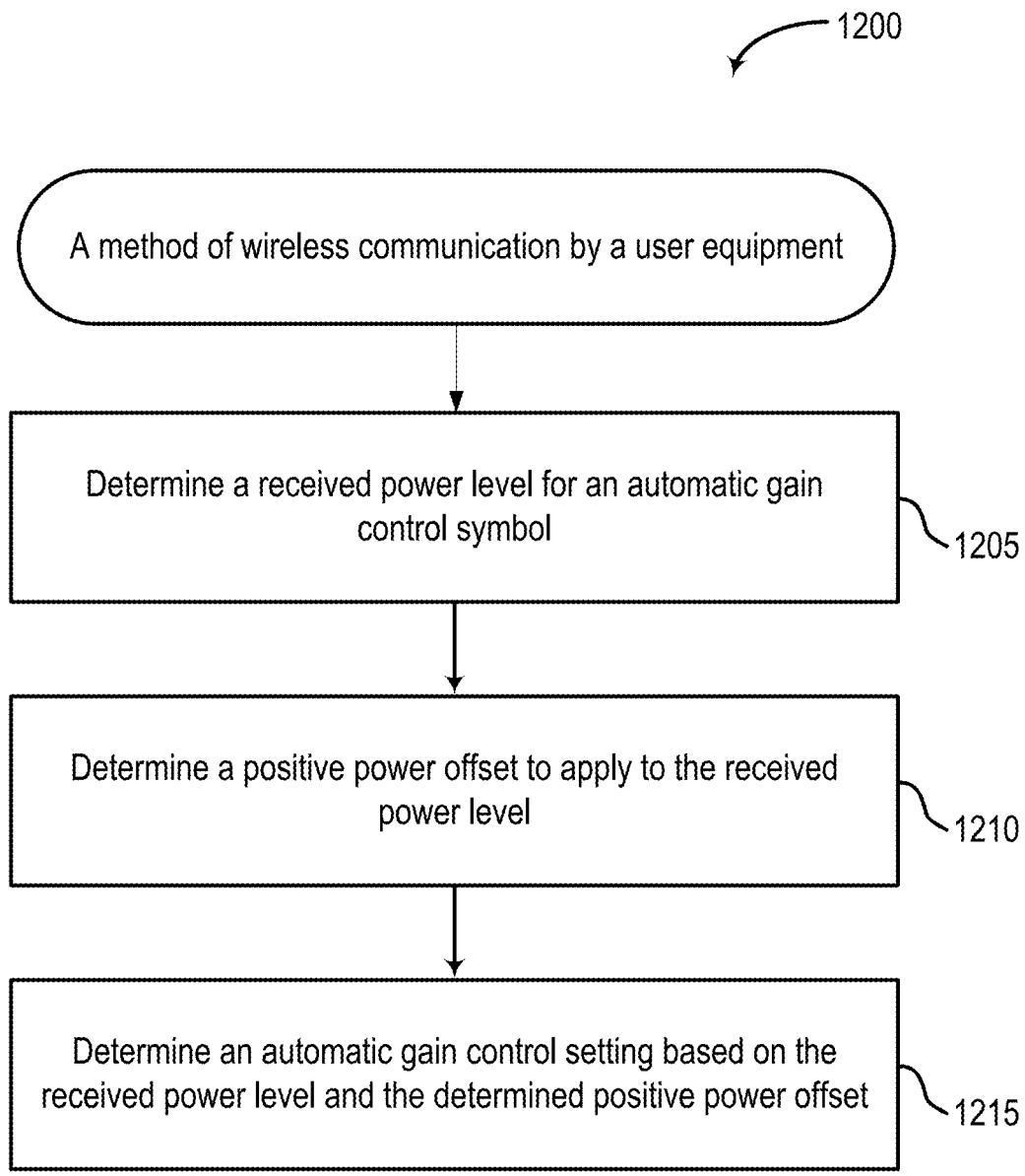

So now, the problem is recast as how to transmit first AGC symbol 542 on broad beam 516 with x dB more power without exceeding the Tx power limit. A solution is to have a receiver (e.g., second UE 504) add x dB on top of the estimated receive power of an AGC symbol when setting AGC gain. So for example, second UE 504 receives first AGC symbol 542 at 7 dBm, but then sets its AGC gain as if it received first AGC symbol 542 at 10 dBm (assuming x=3). This allows third UE 506 to transmit within its Tx power constraints while allowing second UE 504 to also estimate the actual receive power when third UE 506 transmits on the narrower beams 512 and 514. This solution requires that all UEs in the sidelink network (Tx UEs 502 and 506, and Rx UEs 504, 508, and 510) know that any sidelink Rx UE will add x dB on top of the estimated receive power of an AGC symbol when setting AGC gain. FIG. 12, described below, depicts one example method according to this concept.

Example Methods

Figure 8:
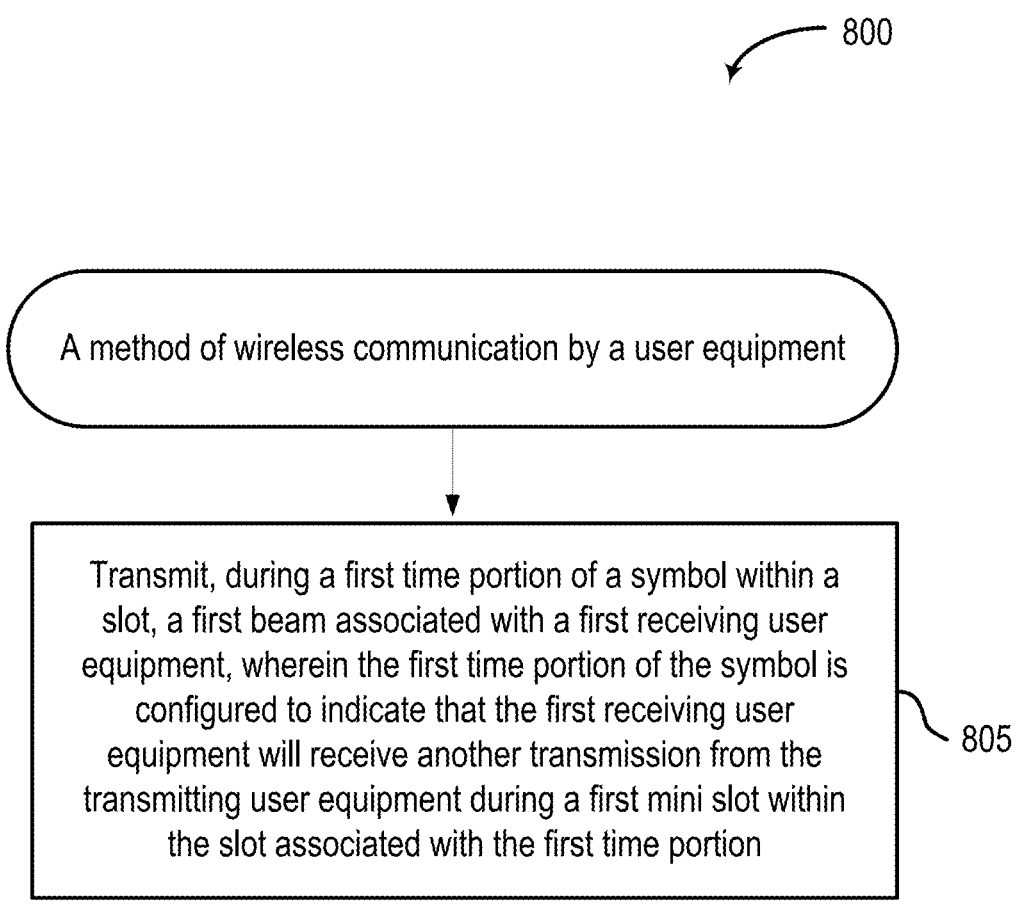
FIGS. 8 through 12 depict example processes for wireless communication according to aspects of the present disclosure.

FIG. 8 shows an example of a method 800 for wireless communication according to aspects of the present disclosure. In some aspects, a user equipment, such as UE 104 of FIGS. 1 and 2, or processing system 1305 of FIG. 13, may perform the method 800.

Method 800 begins at step 805 with transmitting, during a first time portion of a symbol within a slot, a first beam associated with a first receiving user equipment, wherein the first time portion of the symbol is configured to indicate that the first receiving user equipment will receive another transmission from the transmitting user equipment during a first mini-slot within the slot associated with the first time portion. In some cases, the operations of this step refer to, or may be performed by, transmission circuitry as described with reference to FIG. 13.

In some aspects, the method 800 further includes transmitting, during a second time portion of the symbol within the slot, a second beam associated with a second receiving user equipment, wherein the second time portion of the symbol is configured to indicate that the second receiving user equipment will receive another transmission from the transmitting user equipment during a second mini-slot within the slot associated with the second time portion.

In some aspects, the method 800 further includes switching between a first configuration for the first beam and a second configuration for the second beam during a gap period within the symbol.

In some aspects, the symbol is an automatic gain control symbol.

In some aspects, the method 800 further includes transmitting an automatic gain control symbol to the first receiving user equipment using the first beam during the first mini-slot. In some aspects, the method 800 further includes transmitting another automatic gain control symbol to the second receiving user equipment using the second beam during the second mini-slot.

In some aspects, the method 800 further includes transmitting the first beam to a first receiving user equipment during the first mini-slot within the slot. In some aspects, the method 800 further includes transmitting the second beam to a second receiving user equipment during the second mini-slot within the slot.

In some aspects, the method 800 further includes ceasing transmission for at least one symbol between transmitting the first mini-slot and the second mini-slot.

Figure 9:
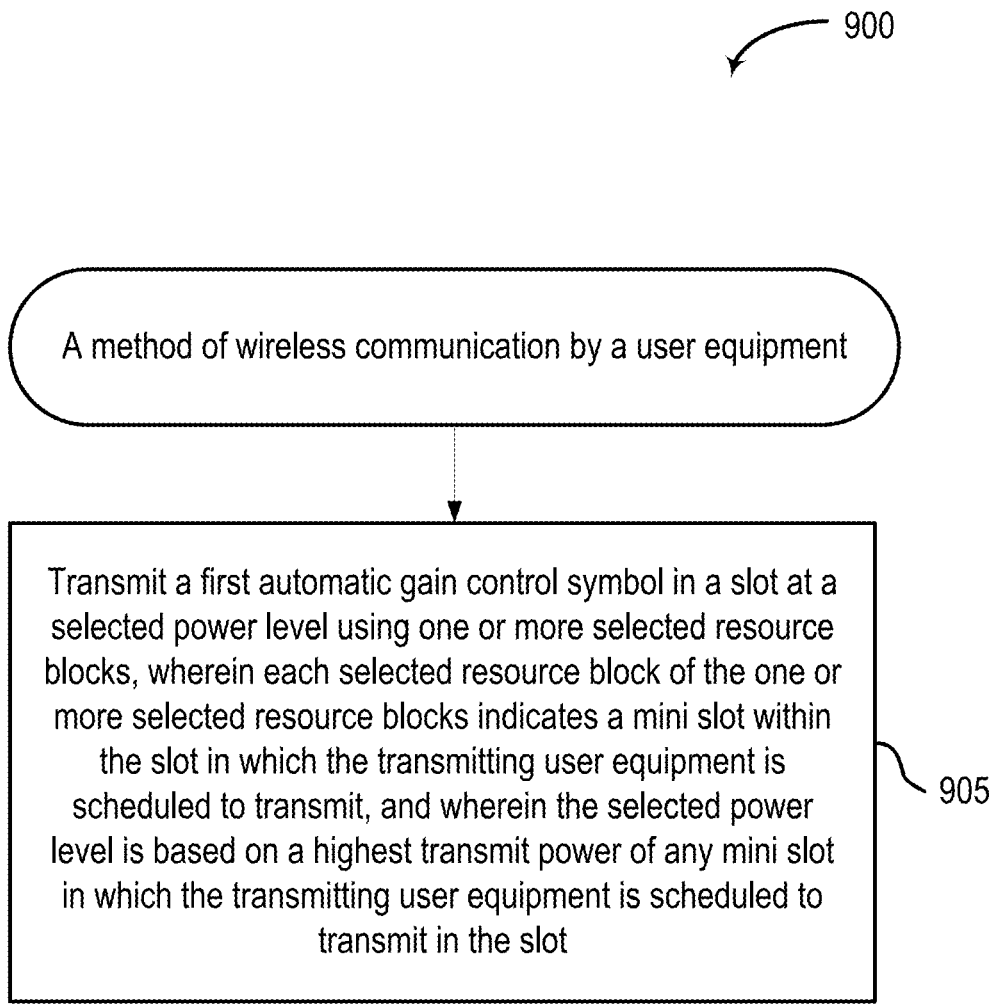

FIG. 9 shows an example of a method 900 for wireless communication according to aspects of the present disclosure. In some aspects, a user equipment, such as UE 104 of FIGS. 1 and 2, or processing system 1305 of FIG. 13, may perform the method 900.

Method 900 begins at step 905 with transmitting a first automatic gain control symbol in a slot at a selected power level using one or more selected resource blocks, where each selected resource block of the one or more selected resource blocks indicates a mini-slot within the slot in which the transmitting user equipment is scheduled to transmit, and where the selected power level is based on a highest transmit power of any mini-slot in which the transmitting user equipment is scheduled to transmit in the slot. In some cases, the operations of this step refer to, or may be performed by, transmission circuitry as described with reference to FIG. 13.

In some aspects, the first automatic gain control symbol is transmitted on a first beam encompassing each beam associated with any mini-slot in which the transmitting user equipment is scheduled to transmit in the slot.

In some aspects, the selected power level is further based on a power compensation factor based on a width of the first beam.

In some aspects, the method 900 further includes transmitting a second automatic gain control symbol to a first receiving user equipment using a second beam during a first mini-slot within the slot.

In some aspects, the method 900 further includes transmitting a third automatic gain control symbol to a second receiving user equipment using a third beam during a second mini-slot within the slot.

In some aspects, the method 900 further includes transmitting data to a first receiving user equipment using the second beam during the first mini-slot within the slot. In some aspects, the method 900 further includes transmitting data to a second receiving user equipment using the third beam during the second mini-slot within the slot.

In some aspects, the method 900 further includes ceasing transmission for at least one symbol between transmitting the first mini-slot and the second mini-slot.

Figure 10:
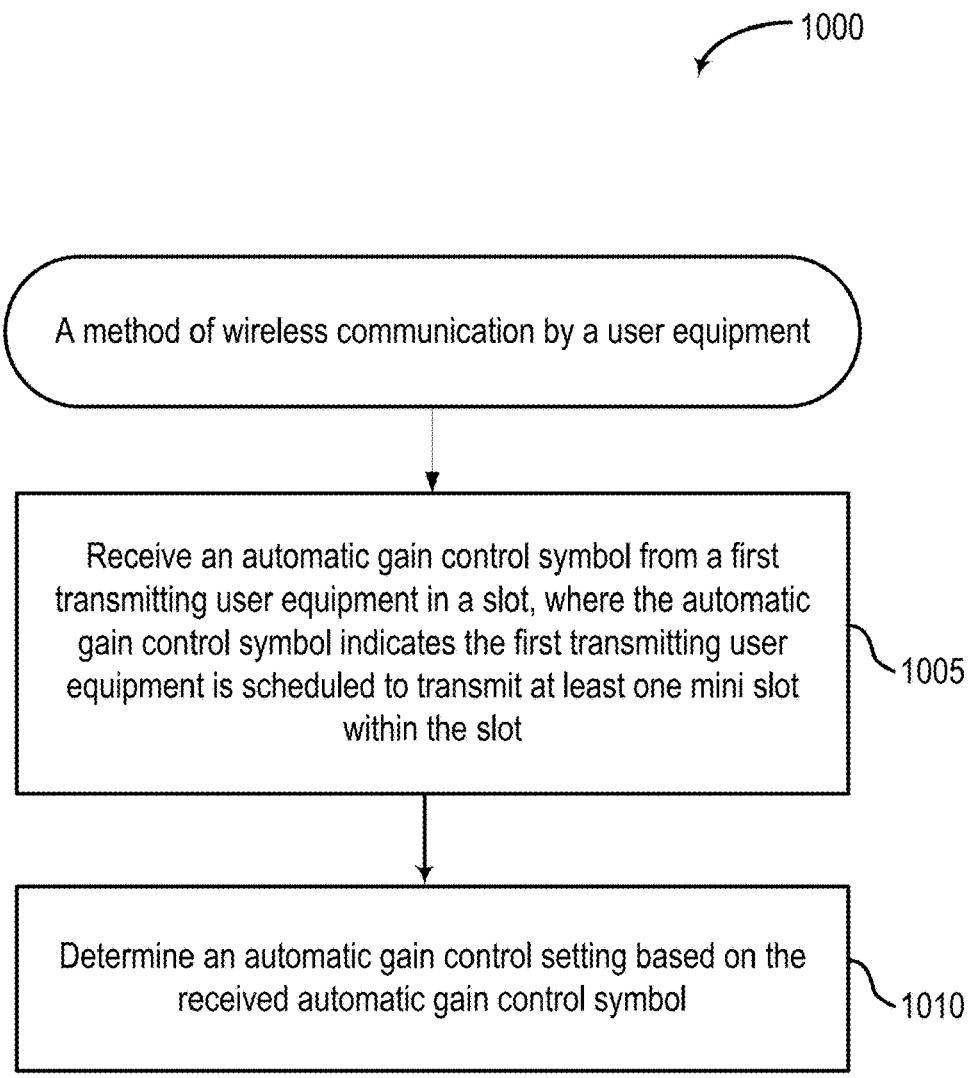

FIG. 10 shows an example of 1000 for wireless communication according to aspects of the present disclosure. In some aspects, a user equipment, such as UE 104 of FIGS. 1 and 2, or processing system 1305 of FIG. 13, may perform the method 1000.

Method 1000 begins at step 1005 with receiving an automatic gain control symbol from a first transmitting user equipment in a slot, where the automatic gain control symbol indicates the first transmitting user equipment is scheduled to transmit at least one mini-slot within the slot. In some cases, the operations of this step refer to, or may be performed by, reception circuitry as described with reference to FIG. 13.

Method 1000 then proceeds to step 1010 with determining an automatic gain control setting based on the received automatic gain control symbol. In some cases, the operations of this step refer to, or may be performed by, AGC setting circuitry as described with reference to FIG. 13.

In some aspects, the method 1000 further includes determining a first received power level during a first time portion of the of the automatic gain control symbol. In some aspects, the method 1000 further includes determining a second received power level during a second time portion of the of the automatic gain control symbol, wherein determining the automatic gain control setting is based on the higher of the first received power level and the second received power level.

In some aspects, the method 1000 further includes determining, based on the received automatic gain control symbol, a first automatic gain control setting for a first mini-slot within the slot, wherein the first automatic gain control setting is different than a second automatic gain control setting for symbols within the slot and outside of the first mini-slot.

In some aspects, the method 1000 further includes receiving a first portion of data from a second transmitting user equipment during the slot using the first automatic gain control setting. In some aspects, the method 1000 further includes receiving a second portion of data from the second transmitting user equipment during the slot using the second automatic gain control setting.

In some aspects, the method 1000 further includes include determining, based on the received automatic gain control symbol, a second automatic gain control setting for a second mini-slot within the slot.

In some aspects, the method 1000 further includes determining a first received power level within a first resource block of the automatic gain control symbol. In some aspects, the method 1000 further includes setting an automatic gain control setting for a first mini-slot within the slot based on the first resource block.

In some aspects, the method 1000 further includes determining a second received power level within a second resource block of the automatic gain control symbol. In some aspects, the method 1000 further includes setting an automatic gain control setting for a second mini-slot within the slot based on the second resource block.

In some aspects, determining the automatic gain control setting based on the received automatic gain control symbol at step 1010 further includes determining a received power level for the automatic gain control symbol and applying a positive power offset to the received power level prior to determining the automatic gain control setting.

Figure 11:
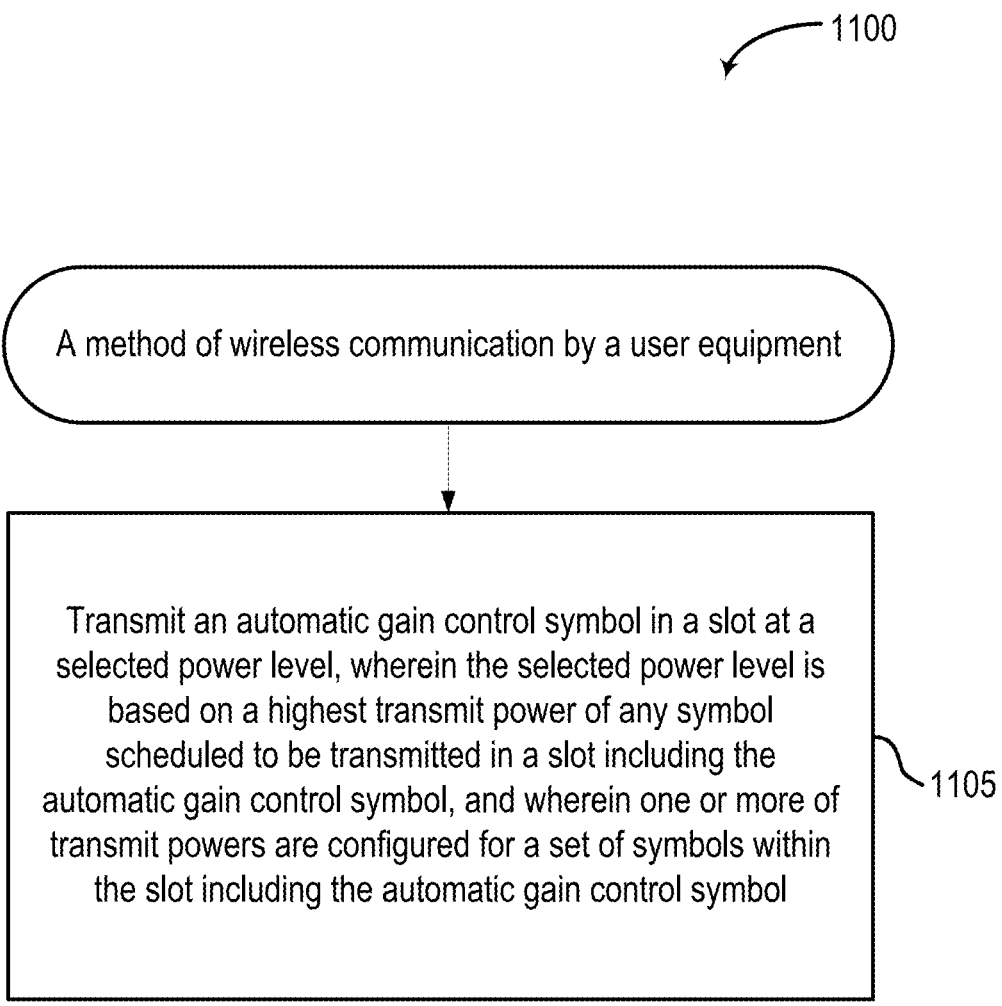

FIG. 11 shows an example of 1100 for wireless communication according to aspects of the present disclosure. In some aspects, a user equipment, such as UE 104 of FIGS. 1 and 2, or processing system 1305 of FIG. 13, may perform the method 1100.

Method 1100 begins at step 1105 with transmitting an automatic gain control symbol in a slot at a selected power level, where the selected power level is based on a highest transmit power of any symbol scheduled to be transmitted in a slot including the automatic gain control symbol, and where one or more of transmit powers are configured for a set of symbols within the slot including the automatic gain control symbol. In some cases, the operations of this step refer to, or may be performed by, transmission circuitry as described with reference to FIG. 13.

FIG. 12 shows an example of 1200 for wireless communication according to aspects of the present disclosure. In some aspects, a user equipment, such as UE 104 of FIGS. 1 and 2, or processing system 1305 of FIG. 13, may perform the method 1200.

Method 1200 begins at step 1205 with determining a received power level for an automatic gain control symbol. In some cases, the operations of this step refer to, or may be performed by, received power level circuitry as described with reference to FIG. 13.

Method 1200 then proceeds to step 1210 with determining a positive power offset to apply to the received power level. In some cases, the operations of this step refer to, or may be performed by, power offset circuitry as described with reference to FIG. 13.

Method 1200 then proceeds to step 1215 with determining an automatic gain control setting based on the received power level and the determined positive power offset. In some cases, the operations of this step refer to, or may be performed by, AGC setting circuitry as described with reference to FIG. 13.

Example Wireless Communication Device

Figure 13:
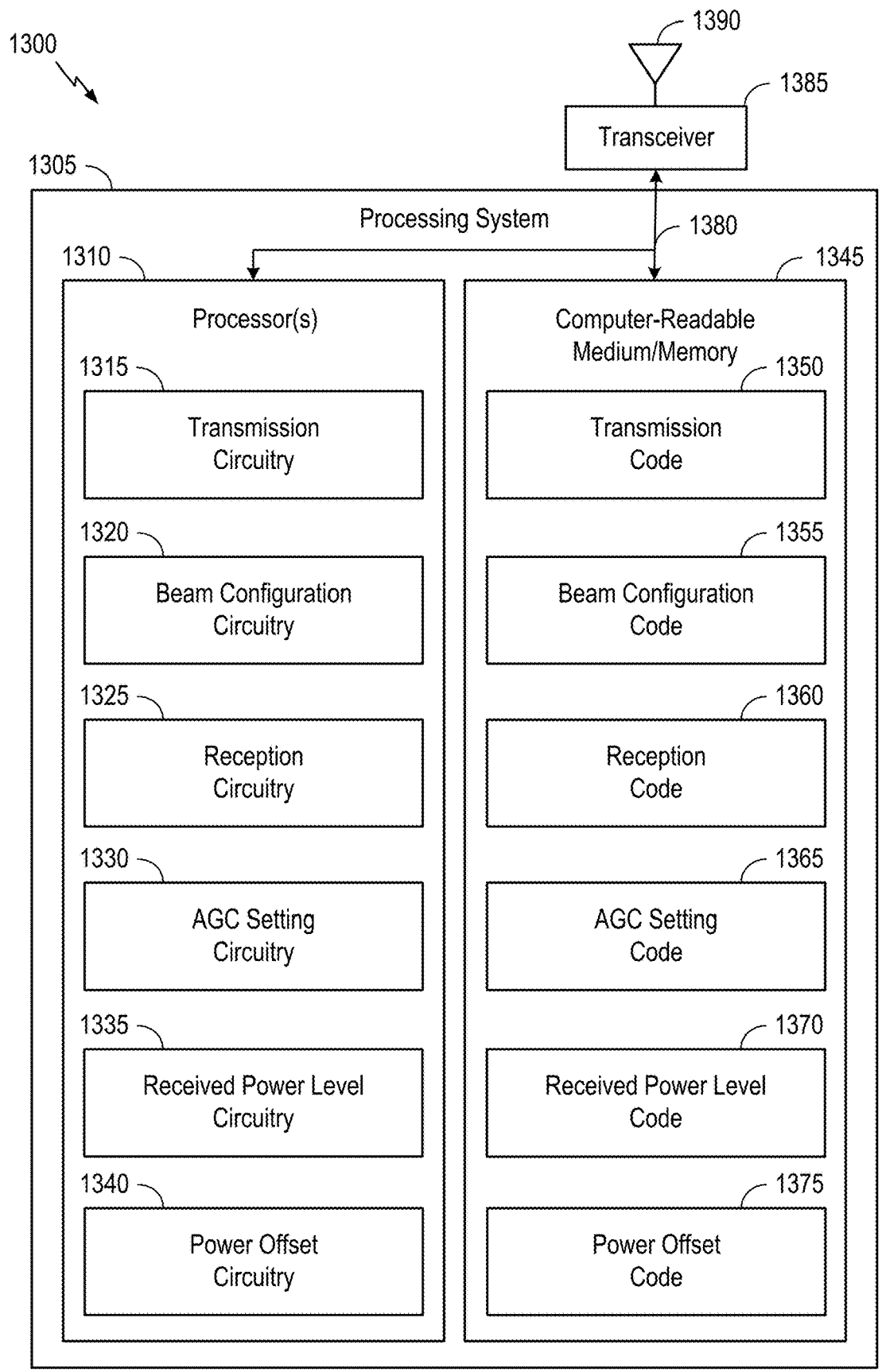
FIG. 13 depicts an example communication device according to aspects of the present disclosure.

FIG. 13 depicts an example communication device 1300 that includes various components operable, configured, or adapted to perform operations for the techniques disclosed herein. In some examples, communication device 1300 may be a UE 104 as described, for example with respect to FIGS. 1 and 2.

Communication device 1300 includes a processing system 1305 coupled to the transceiver 1385 (e.g., a transmitter and/or a receiver). The transceiver 1385 is configured to transmit (or send) and receive signals for the communication device 1300 via the antenna 1390, such as the various signals as described herein. The transceiver 1385 may communicate bi-directionally, via the antenna 1390, wired links, or wireless links as described herein. For example, the transceiver 1385 may represent a wireless transceiver and may communicate bi-directionally with another wireless transceiver. The transceiver 1385 may also include or be connected to a modem to modulate the packets and provide the modulated packets to for transmission, and to demodulate received packets. In some examples, the transceiver 1385 may be tuned to operate at specified frequencies. For example, a modem can configure the transceiver 1385 to operate at a specified frequency and power level based on the communication protocol used by the modem.

Processing system 1305 may be configured to perform processing functions for communication device 1300, including processing signals received and/or to be transmitted by communication device 1300. Processing system 1305 includes one or more processors 1310 coupled to a computer-readable medium/memory 1345 via a bus 1380.

In some examples, one or more processors 1310 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1310 are configured to operate a memory array using a memory controller. In other cases, a memory controller is integrated into the one or more processors 1310. In some cases, the one or more processors 1310 are configured to execute computer-readable instructions stored in a memory to perform various functions. In some aspects, one or more processors 1310 include special purpose components for modem processing, baseband processing, digital signal processing, or transmission processing.

In certain aspects, computer-readable medium/memory 1345 is configured to store instructions (e.g., processor-executable code) that when executed by the one or more processors 1310, cause the one or more processors 1310 to perform the operations illustrated in FIGS. 8-12 or other operations for performing the various techniques discussed herein.

In one aspect, computer-readable medium/memory 1345 includes transmission code 1350, beam configuration code 1355, reception code 1360, AGC setting code 1365, received power level code 1370, and power offset code 1375.

Examples of a computer-readable medium/memory 1345 include random access memory (RAM), read-only memory (ROM), solid state memory, a hard drive, a hard disk drive, etc. In some examples, computer-readable medium/memory 1345 is used to store computer-readable, processor-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communication device 1300 may provide means for performing the methods described herein, including with respect to FIGS. 8-12.

In some examples, means for transmitting or sending (or means for outputting for transmission) may include transceivers 254 and/or antenna(s) 252 of the UE 104 illustrated in FIG. 2 and/or the transceiver 1385 and the antenna 1390 of the communication device in FIG. 13.

In some examples, means for receiving (or means for obtaining) may include transceivers 254 and/or antenna(s) 252 of the UE 104 illustrated in FIG. 2 and/or the transceiver 1385 and the antenna 1390 of the communication device in FIG. 13.

In some examples, means for transmitting, receiving, and determining may include various processing system 1305 components, such as: the one or more processors 1310 in FIG. 13, or aspects of the UE 104 depicted in FIG. 2, including receive processor 258, transmit processor 264, TX MIMO processor 266, and/or controller/processor 280 (including sidelink communications component 281).

In one aspect, one or more processors 1310 includes transmission circuitry 1315, beam configuration circuitry 1320, reception circuitry 1325, AGC setting circuitry 1330, received power level circuitry 1335, and power offset circuitry 1340.

For example, transmission circuitry 1315 and beam configuration circuitry 1320 may provide means for performing aspects of wireless communication techniques performed by a transmitting user equipment described herein.

According to some aspects, transmission circuitry 1315 transmits, during a first time portion of a symbol within a slot, a first beam associated with a first receiving user equipment, where the first time portion of the symbol is configured to indicate that the first receiving user equipment will receive another transmission from the transmitting user equipment during a first mini-slot within the slot associated with the first time portion.

In some examples, transmission circuitry 1315 transmits, during a second time portion of the symbol within the slot, a second beam associated with a second receiving user equipment, where the second time portion of the symbol is configured to indicate that the second receiving user equipment will receive another transmission from the transmitting user equipment during a second mini-slot within the slot associated with the second time portion.

According to some aspects, beam configuration circuitry 1320 switches between a first configuration for the first beam and a second configuration for the second beam during a gap period within the symbol.

In some aspects, the symbol is an automatic gain control symbol.

In some examples, transmission circuitry 1315 transmits an automatic gain control symbol to the first receiving user equipment using the first beam during the first mini-slot. In some examples, transmission circuitry 1315 transmits another automatic gain control symbol to the second receiving user equipment using the second beam during the second mini-slot.

In some examples, transmission circuitry 1315 transmits the first beam to a first receiving user equipment during the first mini-slot within the slot. In some examples, transmission circuitry 1315 transmits the second beam to a second receiving user equipment during the second mini-slot within the slot.

In some examples, transmission circuitry 1315 ceases transmission for at least one symbol between transmitting during the first mini-slot and the second mini-slot.

According to some aspects, transmission circuitry 1315 transmits a first automatic gain control symbol in a slot at a selected power level using one or more selected resource blocks, where each selected resource block of the one or more selected resource blocks indicates a mini-slot within the slot in which the transmitting user equipment is scheduled to transmit, and where the selected power level is based on a highest transmit power of any mini-slot in which the transmitting user equipment is scheduled to transmit in the slot.

In some aspects, the first automatic gain control symbol is transmitted on a first beam encompassing each beam associated with any mini-slot in which the transmitting user equipment is scheduled to transmit in the slot. In some aspects, the selected power level is further based on a power compensation factor based on a width of the first beam.

In some examples, transmission circuitry 1315 transmits a second automatic gain control symbol to a first receiving user equipment using a second beam during a first mini-slot within the slot. In some examples, transmission circuitry 1315 transmits a third automatic gain control symbol to a second receiving user equipment using a third beam during a second mini-slot within the slot. In some examples, transmission circuitry 1315 transmits data to a first receiving user equipment using the second beam during the first mini-slot within the slot. In some examples, transmission circuitry 1315 transmits data to a second receiving user equipment using the third beam during the second mini-slot within the slot. In some examples, transmission circuitry 1315 ceases transmission for at least one symbol between transmitting during the first mini-slot and the second mini-slot.

According to some aspects, transmission circuitry 1315 transmits an automatic gain control symbol in a slot at a selected power level, where the selected power level is based on a highest transmit power of any symbol scheduled to be transmitted in a slot including the automatic gain control symbol, and where one or more of transmit powers are configured for a set of symbols within the slot including the automatic gain control symbol.

Moreover, reception circuitry 1325, AGC setting circuitry 1330, received power level circuitry 1335, and power offset circuitry 1340 may provide means for performing aspects of wireless communication techniques performed by a receiving user equipment described herein.

According to some aspects, reception circuitry 1325 receives an automatic gain control symbol from a first transmitting user equipment in a slot, where the automatic gain control symbol indicates the first transmitting user equipment is scheduled to transmit at least one mini-slot within the slot. According to some aspects, AGC setting circuitry 1330 determines an automatic gain control setting based on the received automatic gain control symbol.

According to some aspects, received power level circuitry 1335 determines a first received power level during a first time portion of the of the automatic gain control symbol. In some examples, received power level circuitry 1335 determines a second received power level during a second time portion of the of the automatic gain control symbol, where determining the automatic gain control setting is based on the higher of the first received power level and the second received power level.

In some examples, AGC setting circuitry 1330 determines, based on the received automatic gain control symbol, a first automatic gain control setting for a first mini-slot within the slot, where the first automatic gain control setting is different than a second automatic gain control setting for symbols within the slot and outside of the first mini-slot. In some examples, reception circuitry 1325 receives a first portion of data from a second transmitting user equipment during the slot using the first automatic gain control setting. In some examples, reception circuitry 1325 receives a second portion of data from the second transmitting user equipment during the slot using the second automatic gain control setting. In some examples, AGC setting circuitry 1330 determines, based on the received automatic gain control symbol, a second automatic gain control setting for a second mini-slot within the slot.

In some examples, received power level circuitry 1335 determines a first received power level within a first resource block of the automatic gain control symbol. In some examples, AGC setting circuitry 1330 sets an automatic gain control setting for a first mini-slot within the slot based on the first resource block. In some examples, received power level circuitry 1335 determines a second received power level within a second resource block of the automatic gain control symbol. In some examples, AGC setting circuitry 1330 sets an automatic gain control setting for a second mini-slot within the slot based on the second resource block.

In some examples, determining the automatic gain control setting based on the received automatic gain control symbol comprises determining a received power level for the automatic gain control symbol (via received power level circuitry 1335) and applying a positive power offset to the received power level prior to determining the automatic gain control setting (via power offset circuitry 1340).

According to some aspects, received power level circuitry 1335 determines a received power level for an automatic gain control symbol. According to some aspects, power offset circuitry 1340 determines a positive power offset to apply to the received power level. According to some aspects, AGC setting circuitry 1330 determines an automatic gain control setting based on the received power level and the determined positive power offset.

Notably, FIG. 13 is just one example, and many other examples and configurations of communication device are possible.

Example Clauses

Implementation examples are described in the following numbered clauses:

Clause 1: A method for wireless communication by a transmitting user equipment, the method comprising: transmitting, during a first time portion of a symbol within a slot, a first beam associated with a first receiving user equipment, wherein the first time portion of the symbol is configured to indicate that the first receiving user equipment will receive another transmission from the transmitting user equipment during a first mini-slot within the slot associated with the first time portion.

Clause 2: The method of Clause 1, further comprising: transmitting, during a second time portion of the symbol within the slot, a second beam associated with a second receiving user equipment, wherein the second time portion of the symbol is configured to indicate that the second receiving user equipment will receive another transmission from the transmitting user equipment during a second mini-slot within the slot associated with the second time portion.

Clause 3: The method of Clause 2, further comprising: switching between a first configuration for the first beam and a second configuration for the second beam during a gap period within the symbol.

Clause 4: The method of Clause 2, further comprising: transmitting an automatic gain control symbol to the first receiving user equipment using the first beam during the first mini-slot; and transmitting another automatic gain control symbol to the second receiving user equipment using the second beam during the second mini-slot.

Clause 5: The method of Clause 4, further comprising: transmitting the first beam to a first receiving user equipment during the first mini-slot within the slot; and transmitting the second beam to a second receiving user equipment during the second mini-slot within the slot.

Clause 6: The method of Clause 5, further comprising: ceasing transmission for at least one symbol between transmitting during the first mini-slot and the second mini-slot.

Clause 7: The method of any one of Clauses 1-6, wherein the symbol is an automatic gain control symbol.

Clause 8: A method for wireless communication by a transmitting user equipment, the method comprising: transmitting a first automatic gain control symbol in a slot at a selected power level using one or more selected resource blocks, wherein each selected resource block of the one or more selected resource blocks indicates a mini-slot within the slot in which the transmitting user equipment is scheduled to transmit, and wherein the selected power level is based on a highest transmit power of any mini-slot in which the transmitting user equipment is scheduled to transmit in the slot.

Clause 9: The method of Clause 8, wherein the first automatic gain control symbol is transmitted on a first beam encompassing each beam associated with any mini-slot in which the transmitting user equipment is scheduled to transmit in the slot.

Clause 10: The method of Clause 9, wherein the selected power level is further based on a power compensation factor based on a width of the first beam.

Clause 11: The method of any one of Clauses 8-10, further comprising: transmitting a second automatic gain control symbol to a first receiving user equipment using a second beam during a first mini-slot within the slot.

Clause 12: The method of Clause 11, further comprising: transmitting a third automatic gain control symbol to a second receiving user equipment using a third beam during a second mini-slot within the slot.

Clause 13: The method of Clause 12, further comprising: transmitting data to a first receiving user equipment using the second beam during the first mini-slot within the slot; and transmitting data to a second receiving user equipment using the third beam during the second mini-slot within the slot.

Clause 14: The method of Clause 13, further comprising: ceasing transmission for at least one symbol between transmitting during the first mini-slot and the second mini-slot.

Clause 15: A method for wireless communication by a receiving user equipment, the method comprising: receiving an automatic gain control symbol from a first transmitting user equipment in a slot, wherein the automatic gain control symbol indicates the first transmitting user equipment is scheduled to transmit at least one mini-slot within the slot and determining an automatic gain control setting based on the received automatic gain control symbol.

Clause 16: The method of Clause 15, further comprising: determining a first received power level during a first time portion of the of the automatic gain control symbol; and determining a second received power level during a second time portion of the of the automatic gain control symbol, wherein determining the automatic gain control setting is based on the higher of the first received power level and the second received power level.

Clause 17: The method of any one of Clauses 15 and 16, further comprising: determining, based on the received automatic gain control symbol, a first automatic gain control setting for a first mini-slot within the slot, wherein the first automatic gain control setting is different than a second automatic gain control setting for symbols within the slot and outside of the first mini-slot.

Clause 18: The method of Clause 17, further comprising: receiving a first portion of data from a second transmitting user equipment during the slot using the first automatic gain control setting; and receiving a second portion of data from the second transmitting user equipment during the slot using the second automatic gain control setting.

Clause 19: The method of Clause 17, further comprising: determining, based on the received automatic gain control symbol, a second automatic gain control setting for a second mini-slot within the slot.

Clause 20: The method of any one of Clauses 15-19, further comprising: determining a first received power level within a first resource block of the automatic gain control symbol; and setting an automatic gain control setting for a first mini-slot within the slot based on the first resource block.

Clause 21: The method of Clause 20, further comprising: determining a second received power level within a second resource block of the automatic gain control symbol; and setting an automatic gain control setting for a second mini-slot within the slot based on the second resource block.

Clause 22: The method of any one of Clauses 15-21, wherein determining the automatic gain control setting based on the received automatic gain control symbol comprises: determining a received power level for the automatic gain control symbol; and applying a positive power offset to the received power level prior to determining the automatic gain control setting.

Clause 23: A method for wireless communication by a transmitting user equipment, the method comprising: transmitting an automatic gain control symbol in a slot at a selected power level, wherein the selected power level is based on a highest transmit power of any symbol scheduled to be transmitted in a slot comprising the automatic gain control symbol, and wherein one or more of transmit powers are configured for a plurality of symbols within the slot comprising the automatic gain control symbol.

Clause 24: A method for wireless communication by a receiving user equipment, the method comprising: determining a received power level for an automatic gain control symbol; determining a positive power offset to apply to the received power level; and determining an automatic gain control setting based on the received power level and the determined positive power offset.

Clause 25: A processing system, comprising: one or more memories comprising processor-executable instructions; one or more processors configured to execute the processor-executable instructions and cause the processing system to perform a method in accordance with any one of Clauses 1-24.

Clause 26: A processing system, comprising means for performing a method in accordance with any one of Clauses 1-24.

Clause 27: A non-transitory computer-readable medium comprising processor-executable instructions that, when executed by one or more processors of a processing system, cause the processing system to perform a method in accordance with any one of Clauses 1-24.

Clause 28: A computer program product embodied on a computer-readable storage medium comprising code for performing a method in accordance with any one of Clauses 1-24.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots.

Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block.

The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of using an automatic gain control symbol to indicate a sidelink minislot in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a transmitting user equipment;
the method comprising:
   transmitting, during a first time portion of a symbol within a slot, a first beam associated with a first receiving user equipment,
   wherein the first time portion of the symbol is configured to indicate that the first receiving user equipment will receive another transmission from the transmitting user equipment during a first mini-slot within the slot associated with the first time portion.

2. The method of claim 1, further comprising:
   transmitting, during a second time portion of the symbol within the slot, a second beam associated with a second receiving user equipment,
   wherein the second time portion of the symbol is configured to indicate that the second receiving user equipment will receive another transmission from the transmitting user equipment during a second mini-slot within the slot associated with the second time portion.

3. The method of claim 2, further comprising switching between a first configuration for the first beam and a second configuration for the second beam during a gap period within the symbol.

4. The method of claim 2, further comprising:
   transmitting an automatic gain control symbol to the first receiving user equipment using the first beam during the first mini-slot; and
   transmitting another automatic gain control symbol to the second receiving user equipment using the second beam during the second mini-slot.

5. The method of claim 4, further comprising:
   transmitting the first beam to the first receiving user equipment during the first mini-slot within the slot; and
   transmitting the second beam to the second receiving user equipment during the second mini-slot within the slot.

6. The method of claim 5, further comprising ceasing transmission for at least one symbol between transmitting during the first mini-slot and the second mini-slot.

7. The method of claim 1, wherein the symbol is an automatic gain control symbol.

8. A transmitting user equipment configured for wireless communication, comprising: one or more memories comprising processor-executable instructions; and one or more processors configured to execute the processor-executable instructions and cause the transmitting user equipment to:
   transmit, during a first time portion of a symbol within a slot, a first beam associated with a first receiving user equipment,
   wherein the first time portion of the symbol is configured to indicate that the first receiving user equipment will receive another transmission from the transmitting user equipment during a first mini-slot within the slot associated with the first time portion.

9. The transmitting user equipment of claim 8, wherein the one or more processors are further configured to cause the transmitting user equipment to:
   transmit, during a second time portion of the symbol within the slot, a second beam associated with a second receiving user equipment,
   wherein the second time portion of the symbol is configured to indicate that the second receiving user equipment will receive another transmission from the transmitting user equipment during a second mini-slot within the slot associated with the second time portion.

10. The transmitting user equipment of claim 9, wherein the one or more processors are further configured to cause the transmitting user equipment to switch between a first configuration for the first beam and a second configuration for the second beam during a gap period within the symbol.

11. The transmitting user equipment of claim 9, wherein the one or more processors are further configured to cause the transmitting user equipment to:
   transmit an automatic gain control symbol to the first receiving user equipment using the first beam during the first mini-slot; and
   transmit another automatic gain control symbol to the second receiving user equipment using the second beam during the second mini-slot.

12. The transmitting user equipment of claim 11, wherein the one or more processors are further configured to cause the transmitting user equipment to:
   transmit the first beam to the first receiving user equipment during the first mini-slot within the slot; and
   transmit the second beam to the second receiving user equipment during the second mini-slot within the slot.

13. The transmitting user equipment of claim 12, wherein the one or more processors are further configured to cause the transmitting user equipment to cease transmission for at least one symbol between transmitting during the first mini-slot and the second mini-slot.

14. The transmitting user equipment of claim 8, wherein the symbol is an automatic gain control symbol.

15. A non-transitory computer-readable medium comprising processor-executable instructions that, when executed by one or more processors of a transmitting user equipment, cause the transmitting user equipment to perform a method of wireless communication, comprising:
    transmitting, during a first time portion of a symbol within a slot, a first beam associated with a first receiving user equipment,
    wherein the first time portion of the symbol is configured to indicate that the first receiving user equipment will receive another transmission from the transmitting user equipment during a first mini-slot within the slot associated with the first time portion.

16. The non-transitory computer-readable medium of claim 15, wherein the method further comprises:
    transmitting, during a second time portion of the symbol within the slot, a second beam associated with a second receiving user equipment,
    wherein the second time portion of the symbol is configured to indicate that the second receiving user equipment will receive another transmission from the transmitting user equipment during a second mini-slot within the slot associated with the second time portion.

17. The non-transitory computer-readable medium of claim 16, wherein the method further comprises: switching between a first configuration for the first beam and a second configuration for the second beam during a gap period within the symbol.

18. The non-transitory computer-readable medium of claim 16, wherein the method further comprises:
    transmitting an automatic gain control symbol to the first receiving user equipment using the first beam during the first mini-slot; and
    transmitting another automatic gain control symbol to the second receiving user equipment using the second beam during the second mini-slot.

19. The non-transitory computer-readable medium of claim 18, wherein the method further comprises:
    transmitting the first beam to the first receiving user equipment during the first mini-slot within the slot; and
    transmitting the second beam to the second receiving user equipment during the second mini-slot within the slot.

20. The non-transitory computer-readable medium of claim 19, wherein the method further comprises ceasing transmission for at least one symbol between transmitting during the first mini-slot and the second mini-slot.

* * * * *